United States Patent
Lai

(10) Patent No.: US 7,548,417 B2
(45) Date of Patent: Jun. 16, 2009

(54) ANTIVIBRATION GUIDE RAIL FOR A COMPUTER DISK DRIVE

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 58 days.

(21) Appl. No.: 11/803,631

(22) Filed: May 15, 2007

(65) Prior Publication Data

US 2008/0288971 A1 Nov. 20, 2008

(51) Int. Cl.
*G06F 1/16* (2006.01)
(52) U.S. Cl. .................................. 361/679.36
(58) Field of Classification Search ............ 361/685
See application file for complete search history.

(56) References Cited

U.S. PATENT DOCUMENTS

| | | | | |
|---|---|---|---|---|
| 5,463,527 A | * | 10/1995 | Hager et al. | 361/685 |
| 6,052,278 A | * | 4/2000 | Tanzer et al. | 361/685 |
| 6,166,901 A | * | 12/2000 | Gamble et al. | 361/685 |
| 6,421,236 B1 | * | 7/2002 | Montoya et al. | 361/685 |
| 6,914,778 B2 | * | 7/2005 | Deckers et al. | 361/685 |
| 7,031,151 B2 | * | 4/2006 | Deckers et al. | 361/685 |
| 2003/0011974 A1 | * | 1/2003 | Curlee et al. | 361/683 |

* cited by examiner

*Primary Examiner*—Lisa Lea-Edmonds
(74) *Attorney, Agent, or Firm*—Pro-Techtor Int'l Services

(57) ABSTRACT

An antivibration guide rail for a computer disk drive, in which soft elastic antivibration pads are additionally located at appropriate positions on a hard plastic guide rail, and the guide rail is fitted to two sides of a disk drive. Accordingly, the antivibration pads are able to absorb vibration produced when the disk drive is running, thereby improving read accuracy of the disk drive, and reducing noise produced by vibration when the disk drive is running.

4 Claims, 6 Drawing Sheets

ANTIVIBRATION GUIDE RAIL FOR A COMPUTER DISK DRIVE

BACKGROUND OF THE INVENTION (a) Field of the Invention

The present invention relates to a guide rail provided with soft elastic antivibration pads that are able to absorb vibration produced when a disk drive is running, thereby improving read accuracy of the disk drive and reducing noise.

(b) Description of the Prior Art

The traditional disk drive requires the aid of guide rails in order to be installed into a disk drive slot of a host computer. Referring to FIG. 1, which shows two pin holes 101 defined in two sides of a general disk drive 100, and two guide rails 200 are fitted to and fixedly positioned on the two sides of the disk drive 100 using screws 300, which penetrate through holes 201 of each of the guide rails 200 and are screwed tight into the pin holes 101. Such a method to secure the guide rails 200 requires the aid of a tool to screw tight the screws, and thus consumes man-hours. Moreover, because cost of the metallic material used to fabricate the guide rails 200 of early times was relatively high, thus operators developed the guide rail 200 made from plastic. Nevertheless, the plastic guide rails 200 are unable to absorb vibration produced when the disk drive is running, and thus read accuracy of the disk drive is affected, and even results in noise being produced.

SUMMARY OF THE INVENTION

A primary object of the present invention is to provide a guide rail that is fitted to two sides of a disk drive, the main body of the guide rail being fabricated from hard plastic. Moreover, soft elastic antivibration pads are used to cover the periphery of the guide rail at appropriate positions thereon. Accordingly, when the antivibration pads are in contact with the disk drive or when the guide rails are respectively slid into tracks of a computer disk drive slot, then the antivibration pads absorb vibration produced when the disk drive is running, thereby improving read accuracy of the disk drive and reducing noise produced when the disk drive is running.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
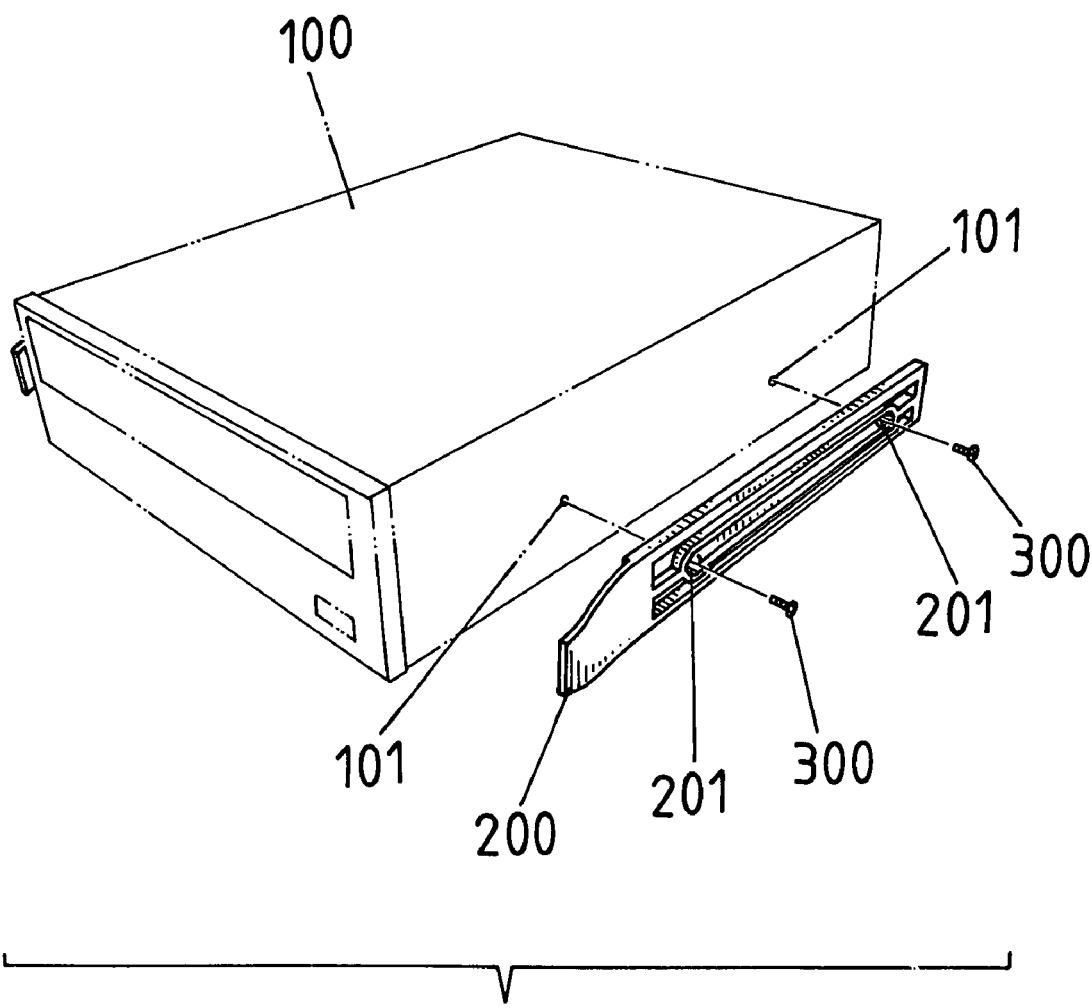
FIG. 1 shows a structural view depicting a disk drive and a guide rail of prior art.
Figure 2:
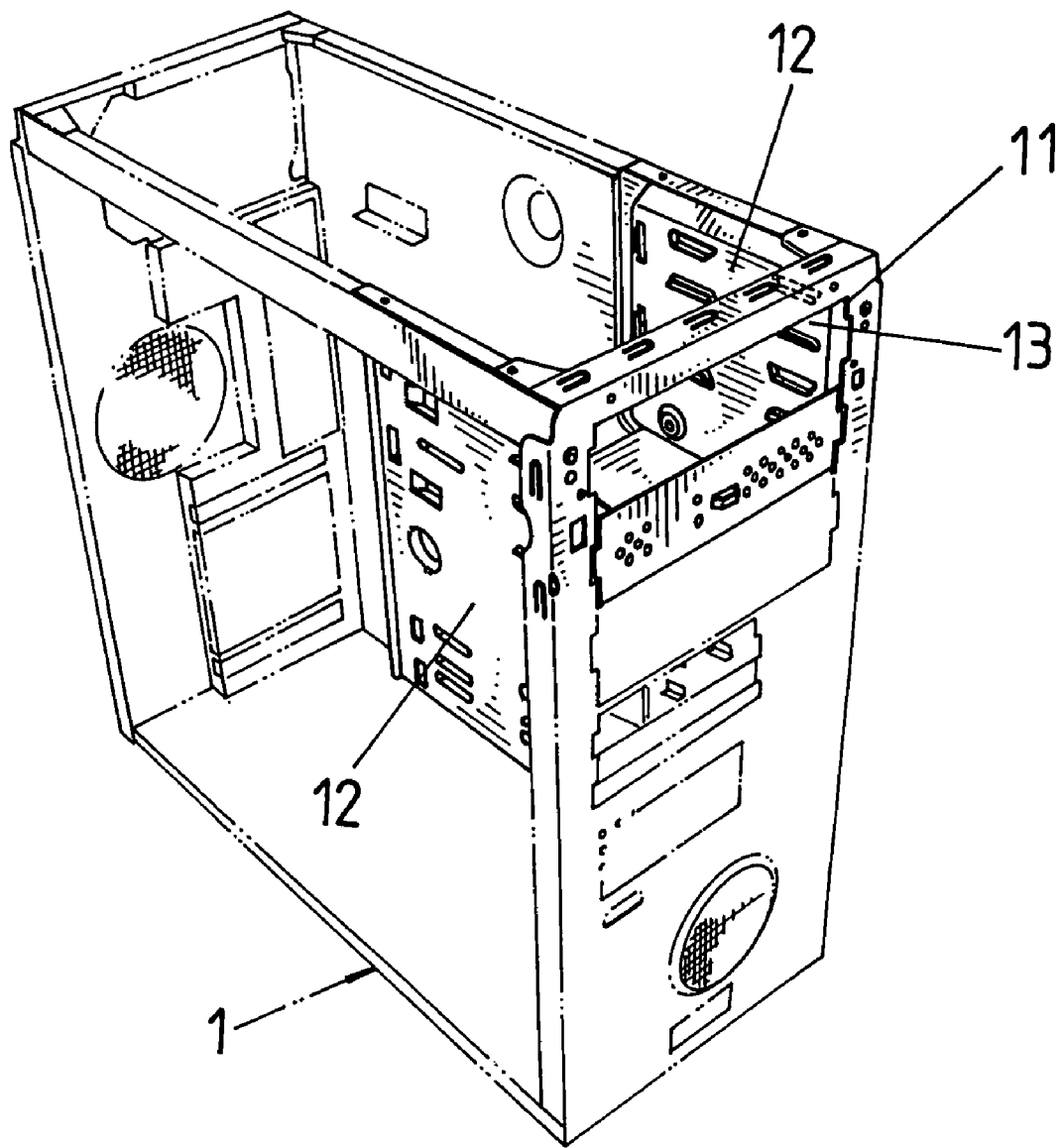
FIG. 2 shows a structural view of a general computer case.
Figure 3:
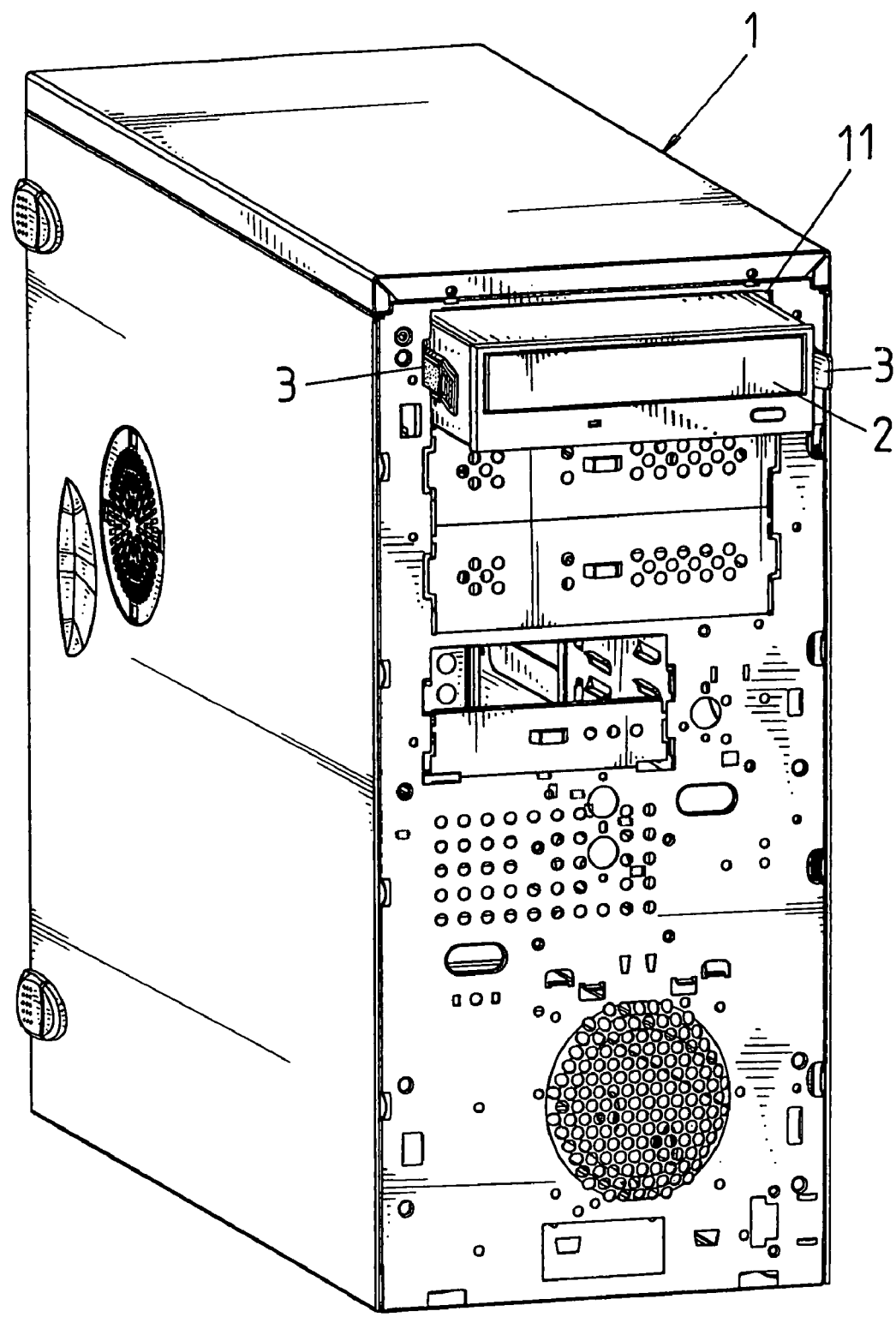
FIG. 3 shows a structural view depicting a disk drive inserted within a computer case according to the present invention.
Figure 4:
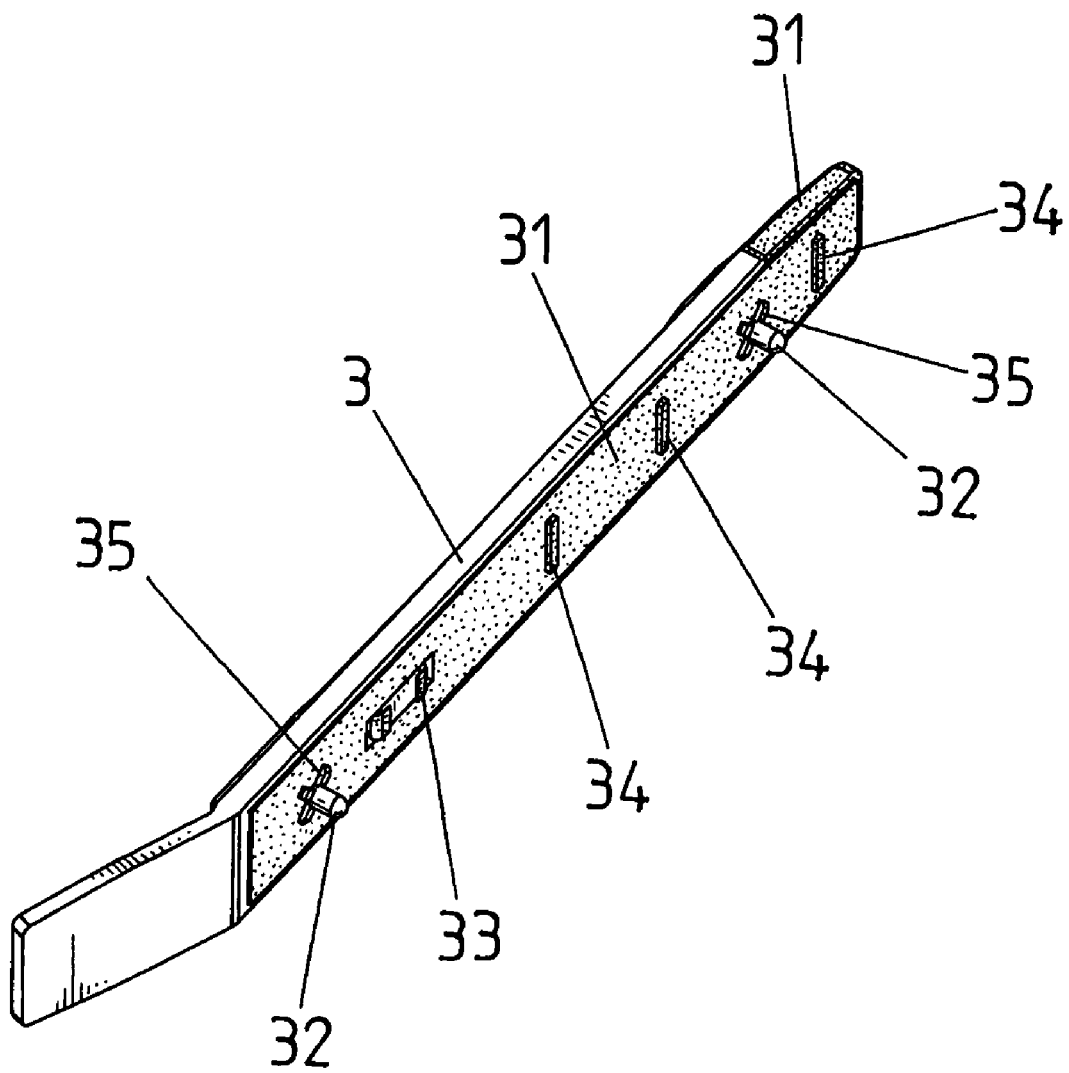
FIG. 4 shows an external view depicting a guide rail of a disk drive according to the present invention.
Figure 5:
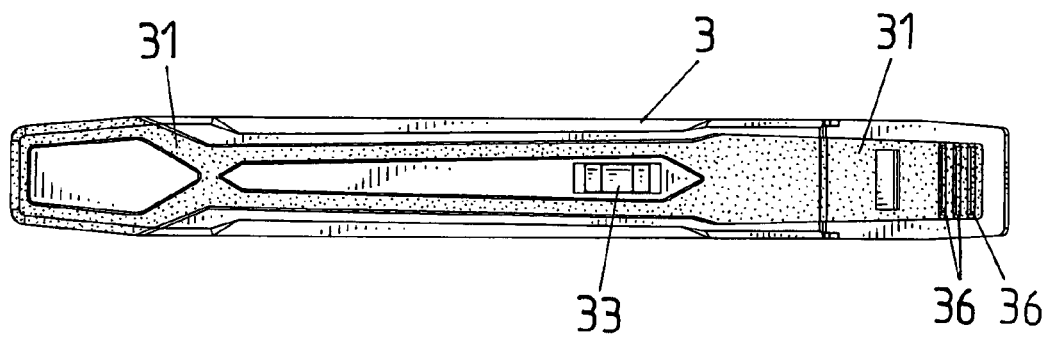
FIG. 5 shows a top view depicting the guide rail of a disk drive according to the present invention.
Figure 6:
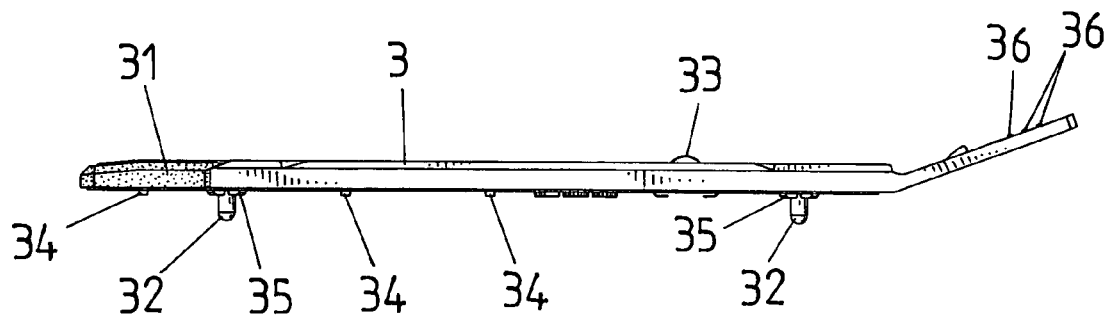
FIG. 6 shows a side view depicting the guide rail of a disk drive according to the present invention.
Figure 7:
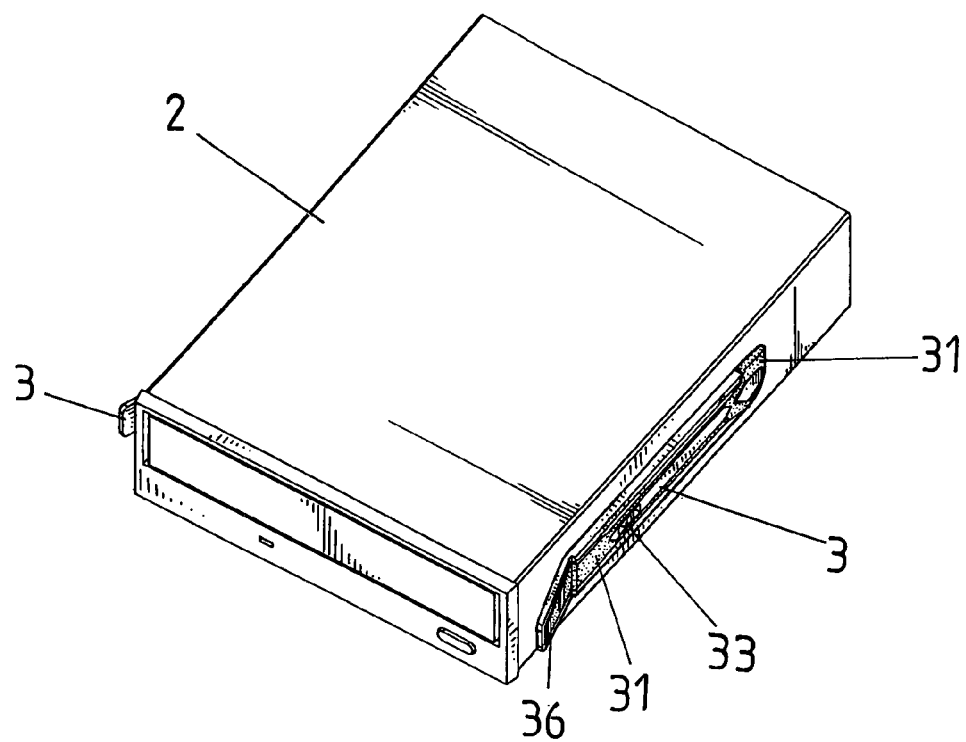
FIG. 7 shows an external view of the guide rails after fitting to a disk drive according to the present invention.
Figure 8:
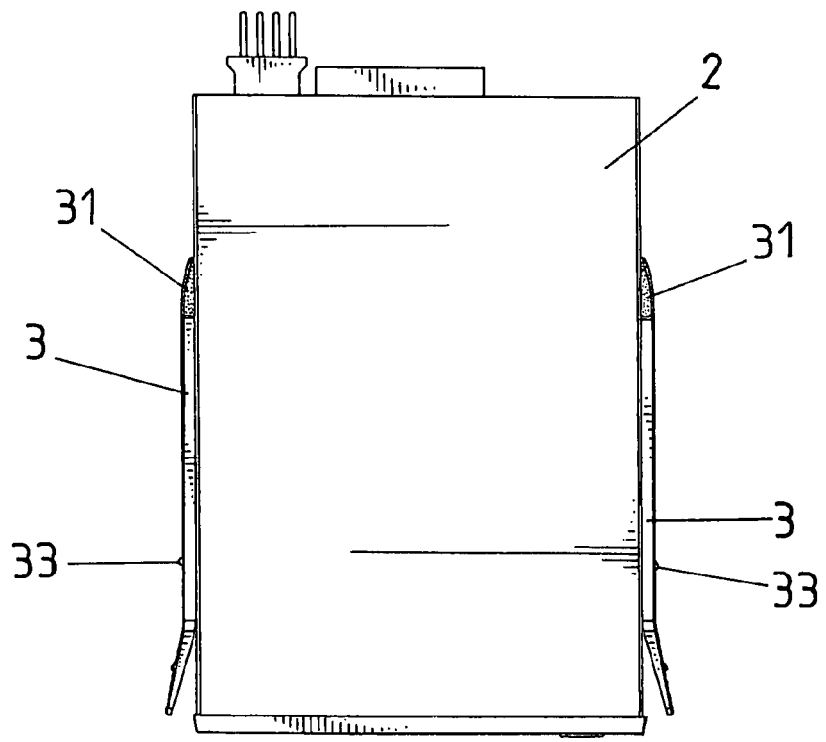
FIG. 8 shows a top view of the guide rails after fitting to a disk drive according to the present invention.

Referring to FIG. 2, which shows a general host computer 1 provided with a disk drive slot 11 that enables a disk drive 2 to be disposed therein, and tracks 13 are respectively located on frames 12 on two sides of the disk drive slot 11. Referring to FIG. 3, two sides of the disk drive 2 are respectively provided with a guide rail 3, thereby enabling the disk drive 2 to slide into the tracks 13 of the two sides of the disk drive slot 11 using the guide rails 3 and positionally inserting the disk drive 2 into the host computer. The present invention is characterized in that:

Referring to FIG. 4~FIG. 6, the main body of each of the guide rails 3 of the present invention is fabricated from hard plastic, while a bottom layer, a tail portion and a top surface of the guide rail 3 are respectively covered at an appropriate position with an antivibration pad 31 fabricated from soft rubber. Referring to FIGS. 7 and 8, two metallic conducting pins 32 on a bottom portion of each of the guide rails 3 are used to respectively insert within pin holes of the disk drive 2 (see FIG. 1, which depicts conventional pin holes 101), and conducting strips 33 hook disposed on inner sides of the guide rails 3 enable electric contact with a power source to effect functioning of the disk drive 2. Moreover, because of close contact between bottom portions of the soft elastic antivibration pads 31 and the disk drive 2, thus, when the disk drive 2 is slid into the metallic tracks 13 of the computer disk drive slot 11 using the guide rails 3, then the antivibration pad 31 fillings on the top surfaces of the guide rails 3 are able to together absorb vibration produced when the disk drive 2 is running, thereby improving read accuracy of the disk drive 2 and reducing noise produced by vibration when the disk drive 2 is running.

Referring again to FIG. 4, a plurality of antivibration raised strips 34 are located on each of the antivibration pads 31 of the bottom portions of the guide rails 3, and a plurality of antivibration protruding pieces 35 surround a periphery of each of the conducting pins 32. Referring to FIGS. 5 and 6, a plurality of rows of antivibration cushion blocks 36 are located on an inclined plane at an end of each of the guide rails 3, thereby strengthening shock absorbing effectiveness between the guide rails 3 and the disk drive 2, and minimizing noise when the disk drive 2 is running.

In conclusion, the guide rails 3 of the present invention are fixedly inserted on two sides of a disk drive, and apart from the soft elastic antivibration pads 31 additionally fitted on each of the guide rails 3 being able to absorb vibration produced when the disk drive is running, and improve read accuracy of the disk drive, moreover, the elastic antivibration pads 31 are able to reduce noise produced when the disk drive is running.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An antivibration guide rail for a computer disk drive, having a left and a right guide rail installed respectively on two sides of a disk drive, each guide rail comprising:
    a main body of the guide rail fabricated from hard plastic, and having a bottom surface in contact with said disk drive, and a top surface;
    a soft elastic antivibration pad layer on the bottom surface and the top surface of each guide rail;

at least one conducting pin on a bottom portion of each guide rail, extending through the antivibration pad and slidingly insertable into a pin hole in a respective side of said disk drive; and at least one conducting strip projecting beyond the antivibration pad on the top surface and extending through the antivibration pad on the bottom surface of each guide rail providing an electrical contact with a surface of the disk drive;

whereby, when the antivibration pads are in contact with the disk drive as when the guide rails are respectively slid into tracks of a computer disk drive slot, the antivibration pads absorb vibration produced when the disk drive is running.

2. The antivibration guide rail for a computer disk drive according to claim 1, wherein a plurality of laterally oriented antivibration raised strip are located on the bottom surface of the antivibration pads of the bottom surface of each guide rail.

3. The antivibration guide rail for a computer disk drive according to claim 1, wherein at least one antivibration protruding piece is circum-located at a periphery of each conducting pin of the guide rail used to insert into the disk drive.

4. The antivibration guide rail for a computer disk drive according to claim 1, wherein at least one antivibration cushion block is located on an inclined plane at an end of the guide rail.

* * * * *